S. H. GILSON.
VEHICLE TIRE.
APPLICATION FILED MAY 2, 1911.
1,004,867.
Patented Oct. 3, 1911.
2 SHEETS—SHEET 1.
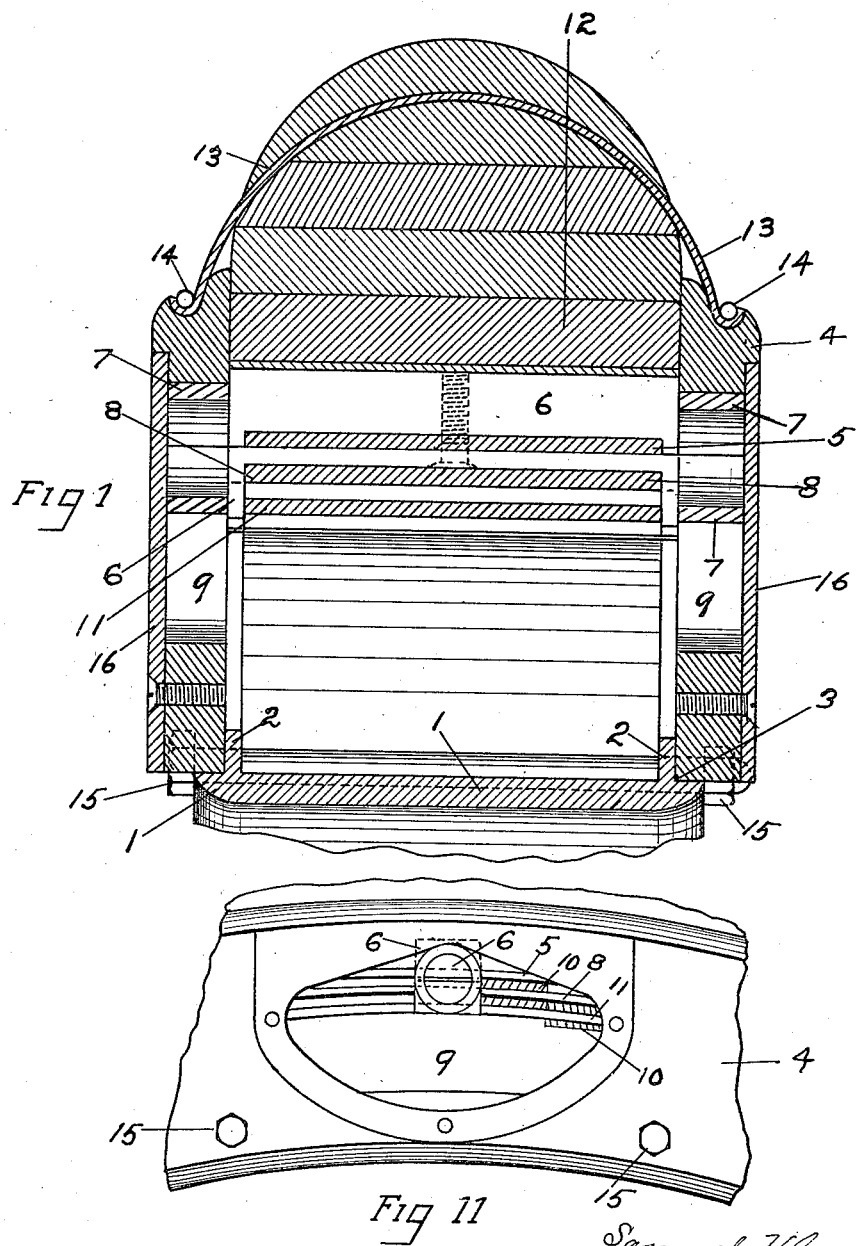

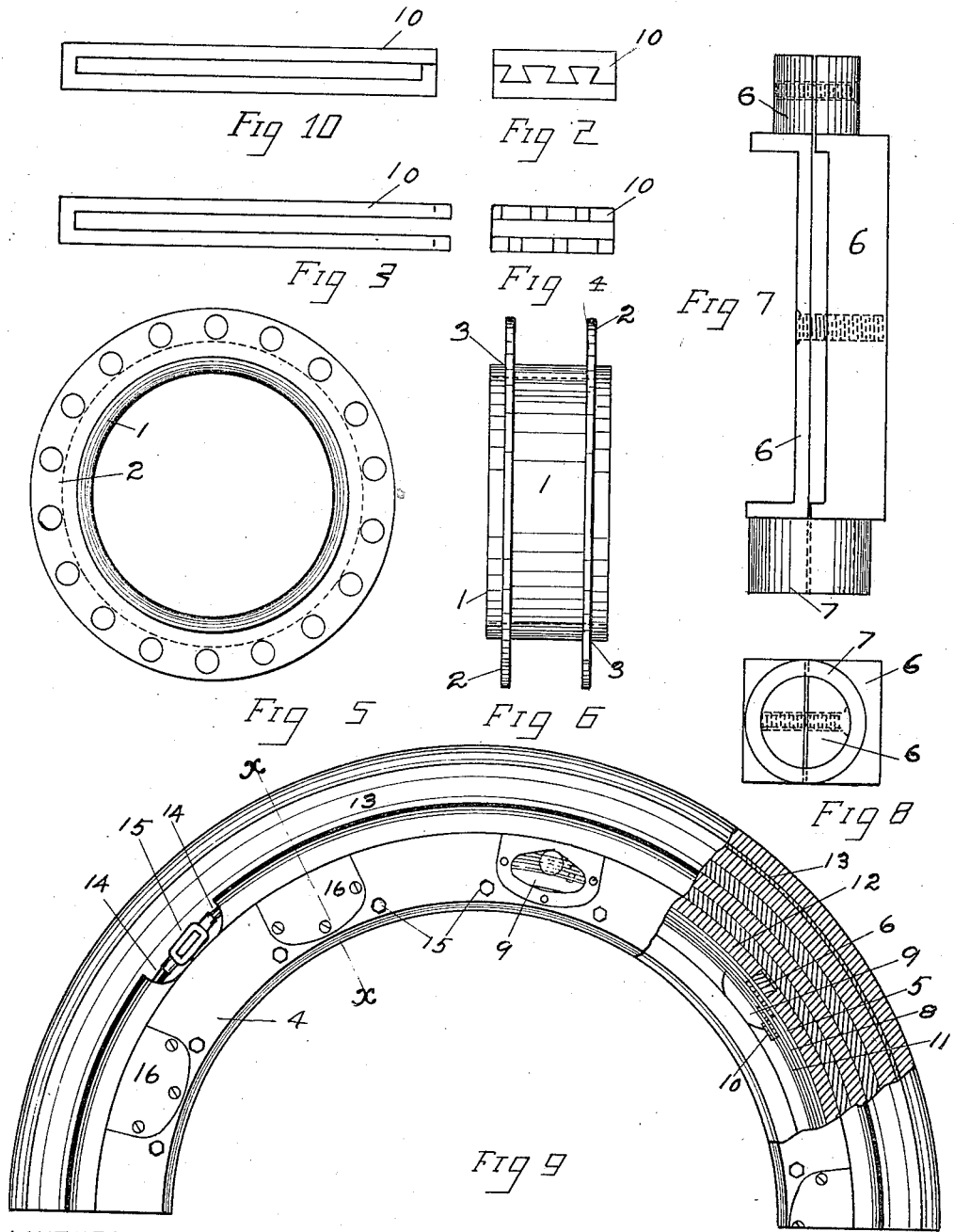

UNITED STATES PATENT OFFICE.

SAMUEL H. GILSON, OF SALT LAKE CITY, UTAH, ASSIGNOR OF ONE-HALF TO JAY S. MILNER, OF SALT LAKE CITY, UTAH.

VEHICLE-TIRE.

1,004,867.      Specification of Letters Patent.      Patented Oct. 3, 1911.

Application filed May 2, 1911. Serial No. 624,671.

*To all whom it may concern:*

Be it known that I, SAMUEL H. GILSON, a citizen of the United States, residing at Salt Lake City, in the county of Salt Lake and State of Utah, have invented certain new and useful Improvements in Vehicle-Tires, of which the following is a specification.

The purpose of my invention is to provide a vehicle tire that is resilient, and that may be constructed without using the pneumatic principle. These objects I accomplish with the device illustrated in the accompanying drawings in which similar letters of reference indicate like parts throughout the several figures.

Figure 1 is a cross section on radial line *x x* of Fig. 9. Fig. 2 is an end elevation of one of the lugs. Fig. 3 is a side elevation of one of the lugs partly formed. Fig. 4 is an end view of the same. Fig. 5 is a side elevation of the metal band. Fig. 6 is an edge elevation of the same. Fig. 7 is a side elevation of one of the lugs with sleeve on one end. Fig. 8 is an end elevation of the same. Fig. 9 is an elevation of a portion of the tire, parts cut away and one of the dust plates removed showing the irregular shaped lug openings in the disk band. Fig. 10 is a side elevation of one of the lugs. Fig. 11 is a side elevation of a portion of the rim with dust plates removed, showing the irregular shaped lug opening in the disk band.

My purpose as previously stated is to provide a vehicle tire that is resilient and that may be used on any vehicle, the one shown being for an automobile, with any of the standard wheels, and is intended to be clamped or fastened to the rim of said wheel.
My tire consists of a metal band 1, having peripheral flanges 2, near the edges thereof, thus forming two shoulders, 3. Two disk bands 4, are fitted, one on each of said shoulders, and are secured to said metal band 1, by the bolts 15, which are inserted through said disk bands 4, and the outwardly extended flanges 2 of said metal band 1, thus firmly holding said disk bands in position, and retaining the hereinafter described resilient bands 5, 8 and 11, and portions of the tread 12, within the outwardly extended channel thus formed. Said disk bands 4 have slots or openings 9, cut therethrough and in transverse alinement. A plurality of concentric resilient bands, made of steel or other metal, are fitted within said channel. Around the outer one of said resilient bands 5, is firmly secured a plurality of transversely placed lugs 6, which lugs are fastened thereto by screws and by clamping said lugs therearound. On each end of each of said lugs is fitted a sleeve 7. Said sleeve extends into and operates within said slots 9. On the axis side of said lugs 6, and in contact therewith, is another of said resilient bands 8, which has also firmly secured therearound by clamping a plurality of transversely placed lugs 10. Portions of said lugs 10 extend radially inward, and other portions outward. Those which extend outward are in contact with said band 5 on its inner side, and with the said lugs 6 on one edge of said lugs. On the axis side of said lugs 10 and in contact therewith is another of said resilient bands, 11, which has firmly secured therearound a plurality of transversely placed lugs 10. The outer portion of each of said lugs 6 is embedded in a laminated tread 12. Said tread 12 is constructed of layers cemented together of any flexible material, such as cotton cloth or leather. Between two of said layers of said tread 12, and cemented thereto, is a dust guard 13. The edges of said guard are extended radially over a portion of the periphery of said disk bands 4, to form a dust flap or guard. The periphery of said disk bands 4 have a peripheric channel therein, made to receive the edge of said disk guard 13, which edge is securely held within said channel by the wire bands 14, each of which have a turn buckle therein for tightening. To keep the said sleeves 7, on the ends of the lugs 6, and within the said slots 9, the plates 16 are secured over said slots. Said plates also prevent dust from coming in contact with the springs and inner parts of my tire. The said lugs 6, with their sleeves 7 thereon, prevent the tread 12, and the resilient band 5, from frictional travel by the said sleeves 7 engaging in the said slots 9. The form of said slots 9, with the tangential outer edges thereof, as shown, returns the said lugs to their position with each revolution of said tire. The radial width of said slots 9 allows the compression in radial direction of the said resilient bands, and thereby supply the resiliency of the tire. The dust guard 13, secured on its edges, by the said wire bands 14, also prevents dust or grit from entering or coming into contact with the inner parts of my tire. For convenience in construction the said lugs 10 are formed first as shown in Fig. 3, and are placed on the said resilient bands 8 and 11 respectively, some on each, and are then bent to tightly engage the said bands by the dove-tailed construction shown in Fig. 2.

Having thus described my invention, I desire to secure by Letters Patent and claim:

1. In a vehicle tire the combination of a metal band having peripheral flanges thereon and forming a shoulder near each edge of said band, a disk band adapted to fit on each of said shoulders, transversely alined slots cut in said disk bands, the outer edges of said slots being tangential to said metal band, concentric resilient bands adapted to fit between said disk bands, transversely placed lugs firmly secured around the outer of said resilient bands, sleeves on the outer ends of said lugs adapted to move within said slots, a plurality of transversely placed lugs 10 on the other resilient bands, and a laminated tread engaging the lugs on and firmly secured to the outer of said resilient bands.

2. In a vehicle tire the combination of a metal band having peripheral flanges near the edges and forming shoulders thereon, a disk band adapted to engage in each of said shoulders, slots in said disk bands the outer edges of which slots are tangential to said metal band, concentric resilient bands adapted to fit between said disk bands, lugs secured on said resilient bands in the plane of the radii thereof, sleeves on the ends of the lugs on the outer of said resilient bands adapted to move within said slots, a laminated tread firmly secured on the outer of said resilient bands, a section of said laminated tread laterally extended and adapted to inclose a portion of the periphery of said disk bands, and retaining bands adapted to hold the edge of said section of said tread in contact with said disk bands.

3. In a vehicle tire the combination of a metal band having peripheral flanges near the edges forming shoulders thereon, disk bands adapted to engage in said shoulders, bolts through said disk bands and said flanges, slots in said disk bands the outer edge of which slots is tangential to said metal band, plates secured thereover, concentric resilient bands adapted to fit between said disk bands, transversely placed lugs secured on the outer of said resilient bands, sleeves on the ends of said lugs adapted to move within said slots, a laminated tread secured on the outer of said resilient bands, a section of said laminated tread radially extended and adapted to inclose a portion of the periphery of said disk bands, wire bands adapted to hold the edge of said section of said tread within peripheral channels formed in the edge of said disk band, and means to tighten said wire bands.

In testimony whereof I have affixed my signature in presence of two witnesses.

SAMUEL H. GILSON.

Witnesses:
JAY S. MILNER,
SAM RANEY.